United States Patent [19]
Ono et al.

[11] Patent Number: 5,182,133
[45] Date of Patent: Jan. 26, 1993

[54] SEALER MATERIAL AND METHOD FOR APPLYING THE SAME

[75] Inventors: Kiyoshi Ono; Yoshio Kishimoto; Tetsuhito Satou, all of Tokyo, Japan

[73] Assignee: Nichiban Company, Limited, Tokyo, Japan

[21] Appl. No.: 777,922

[22] Filed: Oct. 17, 1991

Related U.S. Application Data

[62] Division of Ser. No. 344,377, Apr. 28, 1989, Pat. No. 5,084,346.

[30] Foreign Application Priority Data

Apr. 30, 1988 [JP] Japan ................ 63-108845

[51] Int. Cl.⁵ .............................. B05D 3/06
[52] U.S. Cl. .................. 427/516; 156/275.5; 156/275.7; 264/22; 427/208.4
[58] Field of Search ............. 156/275.5, 275.7; 264/22; 427/44, 54.1, 208.4

[56] References Cited

U.S. PATENT DOCUMENTS 4,668,558 5/1987 Barber .................. 427/44 X
4,985,188 1/1991 Ishio et al. ............. 264/22

*Primary Examiner*—Michael Lusignan
*Attorney, Agent, or Firm*—Foley & Lardner

[57] ABSTRACT

Disclosed is a sealer material, comprising an ionizing radiation curable resin composition layer which is not flowable at a normal temperature and a sealer composition layer and optionally a substrate. Disclosed is also a method for applying the sealer material having the construction as mentioned above.

By using the sealer material of this invention, easy and sure sealing can be made to the portion, to which sealing can not be easily according to conventional methods.

6 Claims, 2 Drawing Sheets

SEALER MATERIAL AND METHOD FOR APPLYING THE SAME

This application is a division of application Ser. No. 07/344,377, filed Apr. 28, 1989, now U.S. Pat. No. 5,084,346.

BACKGROUND OF THE INVENTION

This invention relates to a sealer material which can be applied easily and surely even at the site where application can be made with difficulty and a method for applying the same.

Sealer materials or sealing member materials have been heretofore used in large amounts for sealing of seam of metal plates such as iron plates forming vehicle bodies of automobiles, a street car, etc., the space or gap between iron plates at the seaming portion, corner portion, the space between construction materials such as wood material, plastic material, etc. in buildings and various kinds of gaps. Generally speaking, for application of sealer materials as described above, necessary sealing is performed by use of a sealer gun, by pushing the sealer gun against the application site for sealing, etc. and moving the sealer gun while discharging a sealer material. However, application according to this method, since the gun is moved while being pushed against the application site, for example, in the case of vehicle body of an automobile, it can be effected very efficiently and effectively at the site where application operation with a gun can be easily done as in the case of the side face of the vehicle body, but it is not suitable for application of the side at which gun operation can be difficultly done such as the backside face of the floor or a corner portion, etc. Also, application of a sealer material with a gun is almost impossible at the portion having sharp angle, the place with narrow width or the portion with unevenness such as the cut section of iron plate or rod steel. For this reason, sealing at such portions has been effected by coating an appropriate coating material considerably thick, but satisfactory sealing can be obtained with difficulty due to poor coatability of the coating material, particularly receiving influence from moisture in the case of iron materials, whereby rust is liable to be generated from this portion to pose a great problem.

SUMMARY OF THE INVENTION

An object of the this invention is to provide a sealer material which can be easily and surely applied at the portion where sealing can be effected with difficulty with the sealer or by the application method of the prior art as described above, and a method for applying the sealer material.

The above-mentioned object of the this invention can be accomplished by a sealer material comprising an ionizing radiation curable resin composition layer which is not flowable at normal temperature and a sealer composition layer; or by a method for applying the sealer material comprising pushing the sealer material against a portion to be sealed to adhere the sealer material thereon, and irradiating an ionizing radiation thereto to fix the shape of the ionizing radiation curable resin composition layer, and optionally heating to cure the sealer composition layer.

DESCRIPTION OF THE PREFERRED EMBODIMENTS

Figure 1:
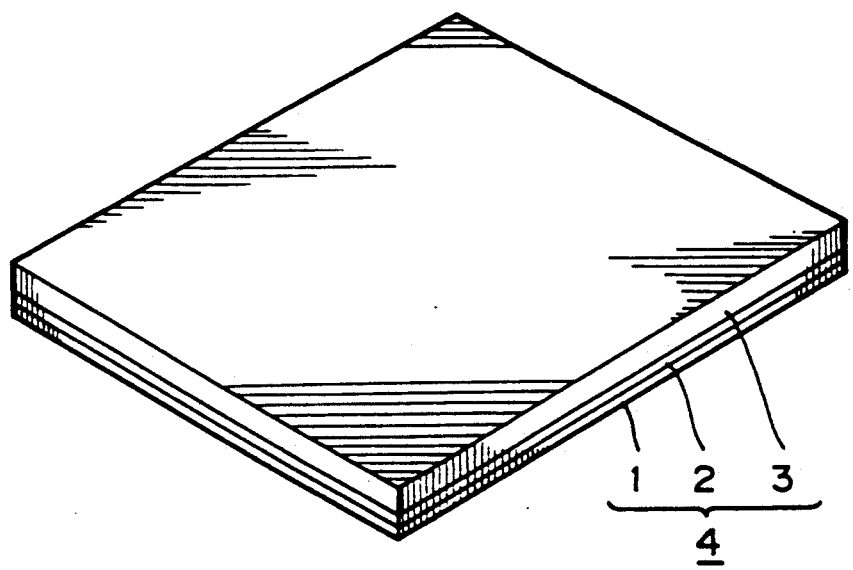
FIG. 1 shows a perspective view of an embodiment of this invention.
Figure 2:
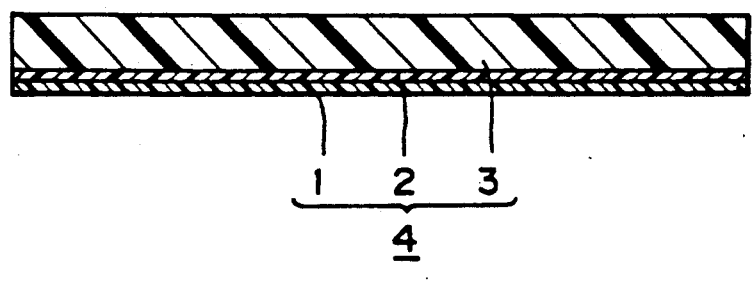
FIG. 2 a sectional view of the embodiment of FIG. 1.

The specific feature in constitution of the sealer material of this invention resides in use of an ionizing radiation curable resin composition layer as a part or all of a curable resin composition layer laminated with the sealer composition layer. In this meaning, the ionizing radiation curable resin composition can be cured partially by, for example, placing a nega-film having an image on the sealer material during irradiation to make the curable resin to be partially cured and the like. As the ionizing radiation curable resin composition, a UV-ray curable resin composition for which no installation cost is required can be used. In the following, description is made by referring to the case in which the UV-ray curable resin composition is used. The sealer composition may be either thermosetting or non-thermosetting.

An embodiment of the sealer material of this invention is those obtained by adhering on a UV-ray transmissive substrate of plastic films such as polyethylene terephthalate (PET), polypropylene (PP) and polyvinylalcohol (PVA) and other materials, a UV-ray curable resin composition layer which is not flowable at a normal temperature (about 0° to 60° C.), and providing a sealer composition layer thereon to form into a sheet or tape shape. The sealer material of this invention, other than the above embodiment, may be formed by laminating suitable number of 3 or more layers which are alternately laminated UV-ray curable resin composition layers and sealer composition layers. In this invention, "not flowable at a normal temperature" means that no flowability is revealed at normal temperature and has a viscosity of $10^4$ cps or more at 60° C., preferably $10^5$ to $10^6$ cps at 60° C.

The above UV-ray curable resin composition layer may be those which are not flowable at normal temperature and have physical properties so that a sealer composition layer can be provided thereon, and may include any known material. Specifically, for example, the UV-ray curable resin composition may include combinations of various polymers with acrylic oligomers or monomers, or epoxy type UV-ray curable resin, etc. may be used in combination. Further, thickeners and extender pigments may be added thereto, and materials which are not flowable, but flexible and plasticizable under normal conditions, for example, clay-like material, etc. may be used. Preferred UV-ray curable resin may include resin compounds of each of a diazo series, azide series, methacrylic series, acrylic series, cinnamoyl series, vinyl series, phenylmaleimide series, etc. Preferred is acrylic series resin compounds such as polyesteracrylate, epoxyacrylate, polyurethane acrylate, polyether acrylate, oligo acrylate, alkyd acrylate, polyol acrylate, etc. Among them, most preferred is polyurethane acrylate.

For the sealer composition layer, resins, fillers and other additives are not limitative so far as, in the case of either non-curable or curable, the layer has a sufficient form retention and adhesiveness to the portion to be sealed to form laminated construction having desired film thickness on the UV-ray curable resin composition layer. Further, in the case of a thermosetting sealer composition, it is required to exhibit no significant reduction in viscosity, to cause no sagging and flowing out of the sealer material applied when thermosetting is done. The sealer composition should preferably have a sufficient ionizing radiation transmission so that the UV-ray curable resin composition layer laminated therewith can be uniformly cured in a short time when ionizing radiation is irradiated.

The sealer composition of this invention may generally include known sealer materials which may be curable or non-curable, having been produced by adding plasticizers, fillers, stabilizers, curing agent, etc. to at least one elastomer selected from synthetic resins such as vinyl chloride resins, ethylene—vinyl acetate copolymers, epoxy resins, alkyd resins, acrylic resins and urethane resins, synthetic rubbers such as chloroprene rubber, butyl rubber, styrene butadiene rubber and isobutene rubber, bituminous substances, natural rubbers and the like. Moreover, the sealer composition may include a reactive adhesive composition which was described separately by the present inventors in Japanese Patent Application No. 266899/1987, with various fillers and other additives in combination. The reactive adhesive composition described therein is one obtained by combining at least one of acrylic type adhesives such as saturated polyester resin, acrylic rubber, polybutadiene, acrylic type copolymer and acrylate type polymer which are in a solid state at a normal temperature; at least one of (meth)acrylic urethane monomer, oligomer and other low molecular weight substance such as (meth)acrylic oligomer which have a viscosity of $10^2$ cps or more at normal temperature; and light-curable or thermosetting catalyst. Preferred sealer composition is a composition comprising 20 to 80 parts by weight of a thermoplastic resin such as a saturated polyester, acrylic rubber, polybutadiene and acrylic- polymer and copolymer, and 80 to 20 parts by weight of a thermosetting or photocurable resin such as a resinous acrylic urethane monomer or oligomer. Particularly preferred ratio of thermoplastic resin/thermosetting or photocurable resin is 40/60 to 60/40 in terms of parts by weight.

As described above, the sealer material of this invention can be formed into a multi-layer structure, and, for example, when a UV-ray curable resin composition layer is sandwiched between the sealer composition layers to form thick three-layers structure, it can be formed in desired shape and used as an adhesive which also functions as the sealer. Although a thin sealer material can be obtained by spreading thinly a sealer composition layer containing a thermosetting resin, etc. as also described in the present specification, it has been impossible to impart a shape thereto. Since, however, a thick and non-flowable sealer material of this invention can be formed in a desired shape and to be a heat-reactive adhesive sheet, adhesion and sealing of molded products can be easily done and thus the work efficiency can be greatly improved. Particularly, it was found that such sealer material is extremely effective for sealing or adhesion between the faces having complicated unevenness.

There are various methods for using and applying the sealer material formed as described above, but they can be classified into, for example, two kinds of methods as described below.

The first method is a method which previously forming a sealer material by laminating ionizing radiation curable resin composition layer(s) and thermosetting sealer composition layer(s), applying the sealer material formed in, for example, a tape as such by plastering it onto an application portion, adjusting the shape corresponding to the application portion and then irradiating UV-ray thereon to cure the UV-ray curable resin layer and fix the shape of the sealer material, and further, in the instance where comprising a thermosetting sealer composition layer, heating the sealer material to cure the sealer composition layer to effect sealing on the application portion. The advantage of this method is that, since the outside faces are fixed by UV-ray irradiation after adjusting the shape by application onto a portion having a complicated shape or sharp angle, etc., there occurs no disfiguring on the sealer in the subsequent curing process by heating in instances where the sealer composition is curable. This method is particularly effective for application at the edge portion of a steel plate. After a sealer material shaped in a tape is pushed against the edge portion to have the zones of its both end portions sticked on the both side surfaces of the edge portions, the shape can be fixed by irradiation of UV-ray. Then, heating is effected and the thermosetting sealer composition layer even if flowability may be increased by heating, will flow with difficulty to be not disfigured in shape, because the UV-ray curable resin composition layer provided on an outer side surface of the sealer composition layer is fixed. Also, when the sealer composition layer of tape- or sheet-like sealer material is non-curable, there is also the advantage that the tack on the surface of the sealer composition layer can be removed by UV-ray irradiation. In the conventional system in which the sealer material is extruded through a sealer gun, it was impossible to apply desired sealing at the edge portion of steel plate and its both side surface portions as described above.

The second method is a method which reforming or molding previously the sealer material, formed in shape of a tape, into a predetermined shape by such means as press molding, etc., and irradiating it to cure the UV-ray curable resin composition layer and thus impart a desired shape thereto under such state. This method is suitable for, for example, the case of applying the sealer onto the surface having much unevenness. Although the application onto the portion having many unevenness thereon may be possible according to the first method, because enormous labors are required in the case of applying on a large number of the same shape. Application becomes extremely efficient if a shape is imparted to the tape-shaped sealer material previously corresponding to the shape of the material to be applied.

According to the methods as mentioned above, it has become possible to apply to the site which could not be applied by the conventional application method with use of a sealer gun, and also application is rendered possible easily for a material with complicated shape.

The present invention is described below by referring to examples.

EXAMPLE 1

A sealer material as shown in FIG. 1 was prepared in the following manner. On a polyethylene terephthalate (PET) film (substrate) 1 with a thickness of 25 μm, a UV-ray curable resin composition layer 2 with the following formulation was provided to have a thickness of 20 μm. Hereinafter, "parts" means "parts by weight".

| UV-ray curable resin composition | |
|---|---|
| Acrylic rubber, PS-250 (Toa Paint K.K.) | 20 parts |
| Urethane acrylate, Biscoat 812 (Osaka Yuki Kagaku Kogyo K.K.) | 80 parts |
| Darocure 1173 (Merck Co.) | 3 parts |

The composition obtained by mixing the above starting materials had no flowability at normal temperature, and also the surface had substantially no tack. Next, on the UV-ray curable resin composition layer 2, a sealer composition layer 3 with the following formulation was provided.

| Saturated polyester, LP-022 (Nippon Gosei Kagaku K.K.) | 70 parts |
|---|---|
| Urethane acrylate, Biscoat 812 (Osaka Yuki Kagaku Kogyo K.K.) | 30 parts |
| Perbutyl IF (Nihon Yushi K.K.) | 1 part |

The sealer composition layer starting materials of the above formulation were homogeneously mixed as a whole at 60° C., and spread as such on the UV-ray curable resin composition layer to have a thickness of 700 μm and cooled to obtain a sealer material 4 consisting of 3 layers including the substrate as shown in FIG. 1. The surface of the sealer composition layer was tacky, and, when it was lightly plastered on an iron plate and the like, it could be also peeled off and plastered again.

The sealer material obtained as described above was pushed against the whole edge portions of a cold rolled steel plate with a thickness of 0.3 mm, a length of 15 cm and a width of 7 cm so that said edge portion is placed at the center, and plastered on the side surfaces of the plate by folding the both ends of the sealer material. Then, UV-ray was irradiated by a 1 kW high pressure mercury lump (80 W/cm) at a distance of 10 to 15 cm for about 2 seconds. The PET film used as the substrate was readily peeled off. Also, thus surface of the sealer material applied had no tack at all. Then, a sheet of steel plate provided with the sealer material at the edge portions was prepared in the same manner. These plates were heated at 140° C. for 30 minutes while one of them was placed vertically and another one horizontally, to obtain test pieces of which the sealer material as a whole was cured.

In the sealer materials applied on the test pieces obtained, there was neither sagging nor peel off at all at the horizontal portion, the vertical portion and the ceiling portion, and also non of the bubbles involved during plastering of the sealer material and those penetrated through the sealer layer. Then, a coating material was coated and baked, but there was no pinhole at all.

COMPARATIVE EXAMPLE 1

On a PET film with a thickness of 25 μm, the sealer composition layer used in Example 1 was spread to have a thickness of 700 μm and cooled without provision of a UV-ray curable resin composition layer to obtain a sealer material.

The sealer material obtained was used similarly as in Example 1 to prepare two sheets of iron plate, and these sheets were heated at 140° C. for 30 minutes, while one of them was placed horizontally and the other vertically to obtain test pieces with cured sealer composition layer. In the test piece heated with the steel plate placed vertically, sagging was observed at the portions of the four corners of the steel plate where the sealer layers were overlapped. Also, at the portion where the sealer layer consists of one layer, the bubbles involved during plastering were found to be punctured to penetrate through the sealer layer elsewhere. In the test piece heated with the steel plate placed horizontally, there were some places where the portion applied at the lower side of the steep plate was peeled and sagged. Then, a coating material was coated and baked similarly as in Example 1, but the bubbles involved were broken and the portion formed by penetration of bubbles through the sealer composition layer remained as pinhole.

EXAMPLE 2

Figure 3:
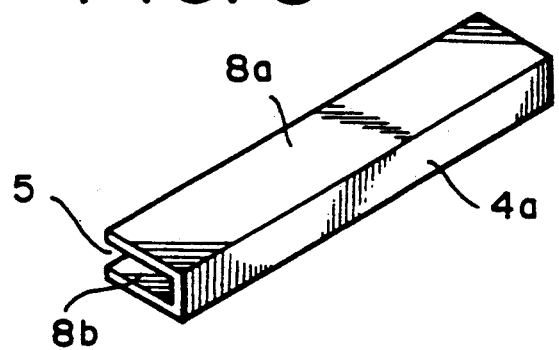
FIG. 3 a perspective view of a sealer molded product.

A molded sealer material as shown in FIG. 3 was prepared in the following manner. The sealer material 4 consisting of 3 layers obtained in Example 1 was cut into a width of 20 mm and a length of 20 cm, and the PET film 1 was peeled off and the remained layer consisting of layers 2 and 3 was applied onto a molding machine (UV-ray transmissive), of which the working surface was treated with Teflon so that the molded product can easily be removed, to be molded into a U-shape having an opening of 0.8 mm at a temperature of 60° C., and after irradiation of UV-ray by a 1 kW high pressure mercury lamp (80 W/cm) at a distance of 10 to 15 cm for about 2 seconds, the U-shaped sealer molded product was taken out from the mold. The molded product is shown in FIG. 3. The inner side surface 8b was the sealer composition layer and the outer side surface 8a was UV-ray curable resin composition layer. The sealer molded product 4a had no tack on the outer side surface 8a, but had a tack on the inner side surface 8b of the opening 5. When the sealer molded product was applied on the edge portion (cut section) of a cold rolled steel plate with a thickness of 0.8 mm, application could be smoothly done because of no presence of tack at all on the outer side surface of said molded product. The material was subjected to curing by heating at a temperature of 150° C. for 20 minutes, whereby there was no sagging at all. Also, none of the bubbles involved during plastering were penetrated through the layer. Subsequently, a coating material was coated and baked, but there was no pinhole, etc. at all.

Next, molded sealer materials having the similar shapes were prepared by, for example, replacing the inner side material and outer side material; using a sealer material comprising alternately sandwiched layers and the like. There were revealed the similar good results at the application sites such as inner side of a gap, slot and the like.

EXAMPLE 3

Figure 4:
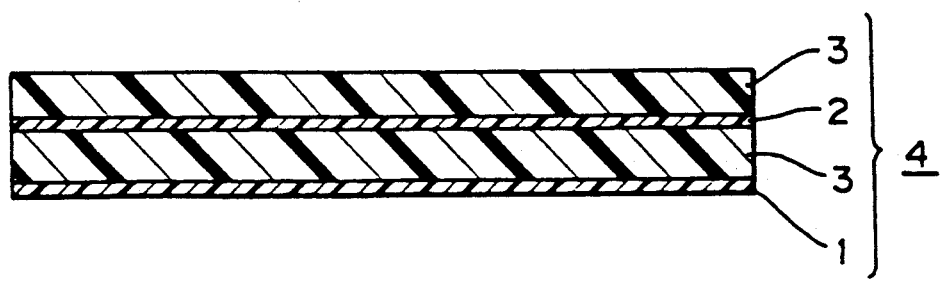
FIG. 4 a sectional view showing a modification example.

A sealer material 4 as shown in FIG. 4 was firstly prepared as follows. On a substrate of a biaxially stretched polypropylene film 1 with a thickness of 30 μm, a thermosetting sealer composition layer 3, a UV-ray curable resin composition layer 2, a thermosetting sealer composition layer 3 with the following formulations were laminated in this order to obtain a sealer material 4.

| Thermosetting sealer composition | |
| --- | --- |
| Polyacrylate resin | 100 parts |
| Epoxy resin, Alardite Y-261 (Ciba Geigy Co.) | 80 parts |
| Dicyandiamide (Carbide K.K.) | 5 parts |
| Aerosil No. 300 (Nippon Aerosil K.K.) | 10 parts |
| Photo (UV-ray) curable resin composition | |
| Acrylic urethane resin, Thiocol | 60 parts |
| Saturated polyester resin, Bylon 200 (Toyo Boseki K.K.) | 40 parts |
| Darocure 1173 (Merck Co.) | 3 parts |

The thickness of the thermosetting sealer composition layer was controlled to be 500 μm and the UV-ray curable resin composition layer 100 μm.

Figure 6:
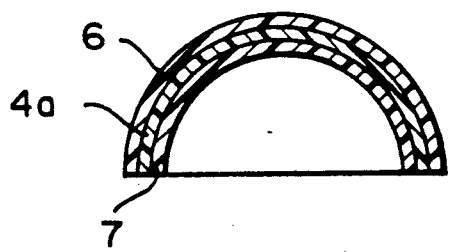
FIG. 6 a diagram for illustrating the applying method of this invention.
Figure 5:
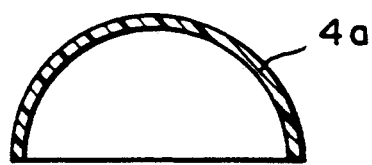
FIG. 5 a sectional view of another sealer molded product.
Figure 5:
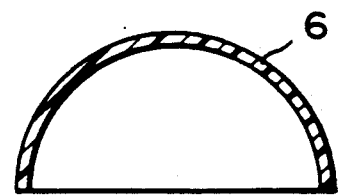
Figure 5:
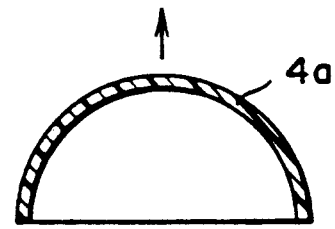
Figure 5:
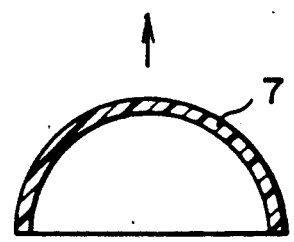

The sheet-shaped sealer material thus obtained was further covered with a non-stretched polyethylene film with a thickness of 75 μm. The sealer material obtained as described above was shaped by applying a pressing machine having a concave mold portion of 10 mm × 10 mm with a depth of 3 mm and a convex mold portion of 8 mm × 8 mm with a height of 2 mm to be pressed at 60° C. Subsequently, after one of the concave or convex mold of the pressing machine was removed, UV-ray was irradiated by 1 kW high pressure mercury lamp (80 W/cm) for about 2 seconds to obtain a sealer material 4a as shown in FIG. 5 provided with a desired shape. After removal of the polyethylene cover film having a convex surface, the sealer material 4a was inserted between the steel plates 6 and 7 as shown in FIG. 6, which were shaped into the same shape by means of the concave mold and the convex mold of the pressing machine, by fitting application of the sealer material into the iron plate formed internally concave shape 6, placing the other iron plate 7 formed in convex shape thereon and applying a pressure to plaster the iron plates shaped in concave mold shape and convex mold shape. Application could be done easily because the shapes were the same. The application is briefly illustrated in FIG. 6. Then, heating was effected at 140° C. for 30 minutes, whereby the two sheets of the iron plates were found to be firmly bonded.

EXAMPLE 4

On a PP (polypropylene) film 1 with a thickness of 30 μm, a UV-ray curable resin composition layer 2 with the following formulation was provided to have a thickness of 30 μm.

| UV-ray curable resin composition | |
| --- | --- |
| Ethylene - vinyl acetate copolymer, Evaflex EV-150 (Mitsui Polychemical) | 30 parts |
| Urethane acrylate, UV-4200B (Nippon Gosei) | 70 parts |
| Irugacure 651 (Ciba Geigy Co.) | 3 parts |

The UV-ray curable resin composition layer formed had no flowability at normal temperature, and also the surface had substantially no tack. Next, on the UV-ray curable resin composition layer, a sealer composition layer with the following formulation was spread to have a thickness of 300 μm, and the surface was covered with a non-stretched polyethylene film having a thickness of 40 μm.

| Sealer composition (non-curable) | |
| --- | --- |
| Butyl rubber (Nihon Butyl, Butyl LM) | 100 parts |
| Fine silicate powder (Nippon Aerosil K.K., Aerosil #300) | 40 parts |
| Carbon black (Asahi Carbon, Asahi #60FEF) | 100 parts |
| Polybutene resin (Nihon Sekiyu Kagaku, Nisseki Polybutene HV-1900) | 180 parts |

Next, the polyethylene film side was fitted and pushed to a molding face having a corner of 90°, followed by irradiation of UV-ray from the PP film side to obtain a sealer material with a folding degree of 90°. The cover film of polyethylene was peeled off and was applied onto a portion of a steel plate folded in right angle. The sealer material was kept stably by the sealer composition layer having adhesiveness, resulting in easy application.

EXAMPLE 5

On a polyvinyl alcohol (PVA) film with a thickness of 40 μm, a UV-ray curable resin composition layer with the following formulation was provided to have a thickness of 50 μm.

| UV-ray curable resin composition | |
| --- | --- |
| Urethane acrylate, UV-3000B (Nippon Gosei) | 60 parts |
| Aerosil R-972 (Nippon Aerosil K.K.) | 40 parts |
| Darocure 1173 (Merck Co.) | 3 parts |

The composition obtained by mixing the above starting materials had no flowability at normal temperature, and also the surface had substantially no tack.

| Sealer composition (non-curable) | |
| --- | --- |
| Vinyl chloride resin (Nihon Zeon, Zeon 121) | 16 parts |
| Styrene butadiene rubber (Nihon Synthetic Rubber, JSR 1500) | 5 parts |
| Calcium carbonate (Maruo Calcium, MSK-C) | 48 parts |
| Synthetic resin (acrylic resin; Mitsubishi Rayon, Acrypet VH) | 2 parts |
| Phthalic acid ester (Kao, DOP) | 27 parts |
| Aging inhibitor (Kawaguchi Kagaku Kogyo, Antage W-500) | 2 parts |

The sealer composition layer with the above formulation was spread on the above UV-ray curable resin composition layer to have a thickness of 1 mm to obtain a sealer sheet. The thus obtained sealer sheet was cut into a width of 20 mm and applied onto an edge portion of a glass plate with a thickness of 30 mm by fitting the sealer composition layer side to the glass to be molded into a U-shape. After irradiation of UV-ray by a 1 kW high pressure mercury lamp of 1 kW for about 1 second, the PVA film was peeled off to obtain a glass plate of which the edge portion was sealed by a sealer material having a sealer composition layer coated with a UV-ray cured resin layer. The sealer material was kept stably on an edge portion of the glass plate by the adhesiveness of the sealer composition. The surface of the sealer material had no tack and was easy in handling.

EXAMPLE 6

On a PET film with a thickness of 25 μm, a UV-ray curable resin composition layer with the following formulation was to have a thickness of 50 μm. The resin composition obtained by mixing them had no flowability at normal temperature and also the surface had substantially no tack.

| UV-ray curable resin composition | |
|---|---|
| Saturated polyester resin, Polyester LP-044 (Nippon Gosei) | 60 parts |
| Urethane acrylate, C-9054 (Sartomer) | 40 parts |
| Irgacure 651 | 3 parts |

Next, on the above UV-ray curable resin composition layer, a thermosetting sealer composition layer with the following formulation was spread to have a thickness of 500 μm to obtain a sealer sheet. The thus obtained sealer sheet had a sufficient adhesiveness to keep itself on the portion to be applied.

| Sealer composition (thermosetting) | |
|---|---|
| Saturated polyester resin, Bylon 200 | 40 parts |
| Acrylic urethane resin, thiocol | 60 parts |
| Darocure 1173 | 5 parts |

The sealer sheet obtained was cut into a width of 15 mm and a length of 15 cm, and this was fitted to a fore-end portion of a cool-rolled steel plate with a thickness of 0.3 mm, a length of 15 cm and a width of 7 cm so that the edge portion is placed on the center of the sheet. The both ends of the sheet were folded to the side faces of the steel plate and adhered thereon. Then, UV-ray irradiation was made by use of a 1 kW high pressure mercury lamp for about 2 seconds and the PET film was peeled off easily. The surface of the sealer material had no tack.

Next, the sealer sheet was heated at 140° C. for 30 minutes, resulting in good sealing of the edge portion of the steel plate without flowing and sagging.

EXAMPLE 7

On a conveyer belt of which the surface was coated with Teflon sheet, the following sealer composition was coated to have a thickness of 500 μm and further the following UV-ray curable resin composition was coated to have a thickness of 5 μm, followed by irradiation of UV-ray by use of a high pressure mercury lamp (80 W/cm, 1 kW) at a distance of 10 cm for about 2 seconds. The surface thus obtained had no tack.

| Sealer composition | |
|---|---|
| Saturated polyester, Polyster LP-202 (Nippon Gosei Kagaku Kogyo K.K.) | 70 parts |
| Urethane acrylate, Biscoat 812 (Osaka Yuki-Kagaku Kogyo K.K.) | 30 parts |
| Perbutyl IF (Nihon Yushi K.K.) | 1 part |
| UV-ray curable resin composition | |
| Aronix M-5700 (Toa Gosei Kagaku Kogyo K.K.) | 50 parts |
| Aronix M-1100 (Toa Gosei Kagaku Kogyo K.K.) | 50 parts |
| Darocure 1173 (Merck Co.) | 3 parts |

The thus obtained sheet was rolled around a core rod with a diameter of 10 cm to obtain a sealer material having no substrate. The sealer material obtained had no substrate. Since the UV-ray curable resin composition layer was thin and had an expansibility, the sheet could be wholly expanded by pulling strongly and applied easily to complicated figures such as concave-convex faces. Also, since one side of the sheet was not tacky, its application was done by pressing the other side which was not tacky, the worker could efficiently worked in application.

EXAMPLE 8

By using a polypropylene film with a thickness of 30 μm as a substrate, a tape-shaped sealer material with a substrate was obtained by repeating the same manner as in Example 4. The sealer material was used by peeling the substrate. On an application, it could be used efficiently as used in Example 4.

We claim:

1. A method for applying a sealer material, which comprises:
    pushing a sealer material comprising an ionizing radiation curable resin composition layer which is not flowable at a normal temperature and a sealer composition layer against a portion of a plate to be sealed to adhere and fix the sealer material thereon;
    irradiating an ionizing radiation to fix the shape of the ionizing radiation curable resin composition layer; and
    heating the sealer material to melt and cure the sealer composition layer.

2. The method according to claim 1, wherein the sealer material comprises a substrate to which at least one of the ionizing radiation curable resin composition layer and the sealer composition layer is provided.

3. A method for applying a sealer material, which comprises:
    molding a sealer material comprising an ionizing radiation curable resin composition layer which is not flowable at a normal temperature and a sealer composition layer into a shape into a shape corresponding to a portion to be applied;
    irradiating with ionizing radiation to fix the shape of the ionizing radiation curable resin composition layer; and
    heating the sealer material to melt and cure the sealer composition layer.

4. The method according to claim 3, wherein the sealer material comprises a substrate to which at least one of the ionizing radiation curable resin composition layer and the sealer composition layer is provided.

5. The method for applying a sealer material according to claim 1, wherein said plate is an iron plate.

6. The method for applying a sealer material according to claim 1, wherein said plate is a glass plate.

* * * * *